United States Patent
Hoffmann et al.

(10) Patent No.: US 10,493,867 B2
(45) Date of Patent: Dec. 3, 2019

(54) ADJUSTING DEVICE FOR A VEHICLE SEAT AND VEHICLE SEAT

(71) Applicant: Adient Luxembourg Holding S.à.r.l., Luxembourg (LU)

(72) Inventors: Andreas Hoffmann, Wuelfrath (DE); David Balzar, Leichlingen (DE)

(73) Assignee: Adient Luxembourg Holding S.à.r.l., Luxembourg (LU)

( * ) Notice: Subject to any disclaimer, the term of this patent is extended or adjusted under 35 U.S.C. 154(b) by 161 days.

(21) Appl. No.: 15/560,685

(22) PCT Filed: Mar. 16, 2016

(86) PCT No.: PCT/EP2016/055681
§ 371 (c)(1),
(2) Date: Sep. 22, 2017

(87) PCT Pub. No.: WO2016/150790
PCT Pub. Date: Sep. 29, 2016

(65) Prior Publication Data
US 2018/0105073 A1    Apr. 19, 2018

(30) Foreign Application Priority Data
Mar. 24, 2015    (DE) .................. 10 2015 205 249

(51) Int. Cl.
*B60N 2/06*  (2006.01)
*B60N 2/427*  (2006.01)
*F16H 25/24*  (2006.01)

(52) U.S. Cl.
CPC ......... *B60N 2/067* (2013.01); *B60N 2/42709* (2013.01); *F16H 25/24* (2013.01); *F16H 2025/249* (2013.01)

(58) Field of Classification Search
CPC .. B60N 2/067; B60N 2/42709; B60N 2/4214; F16H 25/24; F16H 25/20; F16H 2025/249; F16H 55/0853; F16H 55/22
(Continued)

(56) References Cited

U.S. PATENT DOCUMENTS 3,323,777 A * 6/1967 McMullen ................ B66F 3/18
254/103
4,790,202 A * 12/1988 Hayashi ............... B60N 2/0224
384/42
(Continued)

FOREIGN PATENT DOCUMENTS

CN    101306654 A    11/2008
CN    100443776 C    12/2008
(Continued)

*Primary Examiner* — Mark R Wendell
(74) *Attorney, Agent, or Firm* — McGlew and Tuttle, P.C.

(57) ABSTRACT

An adjusting device (3), for a vehicle seat (1), includes at least one first adjusting element (5), at least one second adjusting element (7) that moves relative to the first adjusting element (5), a spindle (11) associated with the first adjusting element (5) and having an outer thread (13) for cooperating with an inner thread (64) of a spindle nut (60) associated with the second adjusting element (7). A base body (62) of the spindle nut (60) is made of metal, in particular steel, and at least sections of the inner thread (64) of the spindle nut (60) is made of a plastic or is covered with a plastic layer. A vehicle seat (1) is also provided having an adjusting device (3) of this type.

20 Claims, 2 Drawing Sheets

(58) Field of Classification Search
USPC .................................................... 297/216.1
See application file for complete search history.

(56) References Cited

U.S. PATENT DOCUMENTS

| | | | | | |
|---|---|---|---|---|---|
| 4,802,374 | A * | 2/1989 | Hamelin | ............... | B60N 2/0232 248/429 |
| 4,872,903 | A * | 10/1989 | Periou | .................... | B60N 2/067 74/89.38 |
| 4,966,045 | A * | 10/1990 | Harney | ................ | B60N 2/0224 188/134 |
| 5,048,786 | A * | 9/1991 | Tanaka | ................. | B60N 2/0232 248/429 |
| 5,150,872 | A * | 9/1992 | Isomura | ............... | B60N 2/0232 248/429 |
| 5,528,951 | A | 6/1996 | Takahashi et al. | | |
| 5,613,402 | A * | 3/1997 | Gauger | ................ | B60N 2/0232 248/394 |
| 5,711,184 | A * | 1/1998 | Pryor | .................... | B60N 2/0224 248/429 |
| 5,797,293 | A * | 8/1998 | Chaban | ................ | B60N 2/0232 74/89.36 |
| 6,138,974 | A * | 10/2000 | Okada | .................. | B60N 2/0232 248/429 |
| 6,158,720 | A * | 12/2000 | Patrick | ...................... | B66F 3/18 254/103 |
| 6,260,922 | B1 * | 7/2001 | Frohnhaus | ............. | B60N 2/067 248/424 |
| 6,575,421 | B1 * | 6/2003 | Houston | ............... | B60N 2/0224 248/429 |
| 6,851,330 | B2 * | 2/2005 | Buchanan, Jr. | ........ | B21D 53/24 29/898.06 |
| 6,971,620 | B2 * | 12/2005 | Moradell | ............ | B60N 2/067 248/422 |
| 7,051,986 | B1 * | 5/2006 | Taubmann | ............ | B60J 7/0573 248/429 |
| 7,152,496 | B2 * | 12/2006 | Chen | .................. | F16H 25/2472 74/89.26 |
| 7,484,787 | B2 * | 2/2009 | Hofschulte | .......... | B60N 2/0232 248/429 |
| 7,562,601 | B2 * | 7/2009 | Kurokawa | ........... | B62D 5/0409 74/388 PS |
| 7,640,822 | B2 * | 1/2010 | Suzuki | ................... | F16H 55/22 74/425 |
| 7,681,470 | B2 * | 3/2010 | Maiss | ................. | F16H 25/2472 74/89.23 |
| 8,286,519 | B2 * | 10/2012 | Duits | ................. | F16H 25/24 403/296 |
| 2002/0073790 | A1 * | 6/2002 | Wiesler | ................ | B60N 2/0224 74/89.34 |
| 2004/0012236 | A1 * | 1/2004 | Mallard | ............... | B60N 2/0228 297/344.1 |
| 2004/0206195 | A1 * | 10/2004 | Landskron | ............ | B60N 2/067 74/89.14 |
| 2004/0206878 | A1 * | 10/2004 | Borbe | .................. | B60N 2/0232 248/424 |
| 2005/0103137 | A1 * | 5/2005 | Chang | ................ | F16H 25/2472 74/89.26 |
| 2005/0126333 | A1 * | 6/2005 | Dohles | ........................ | B60J 7/10 74/606 R |
| 2005/0269478 | A1 * | 12/2005 | Woehrle | ..................... | F16H 1/16 248/430 |
| 2006/0060017 | A1 * | 3/2006 | Ruebusch | ............... | A01D 34/69 74/340 |
| 2006/0150758 | A1 * | 7/2006 | Wohrle | ................ | B60N 2/0232 74/89.36 |
| 2006/0186687 | A1 * | 8/2006 | Kimura | ................ | B60N 2/0232 296/65.13 |
| 2006/0213302 | A1 * | 9/2006 | Hoffmann | ........... | B29C 45/1671 74/425 |
| 2006/0249644 | A1 * | 11/2006 | Folliot | ................. | B60N 2/0232 248/429 |
| 2006/0278037 | A1 * | 12/2006 | Borbe | ................ | B60N 2/0232 74/640 |
| 2006/0289717 | A1 * | 12/2006 | Ito | ........................ | B60N 2/0232 248/419 |
| 2007/0068301 | A1 * | 3/2007 | Hoch | ..................... | B60N 2/067 74/425 |
| 2007/0108360 | A1 * | 5/2007 | Ito | ......................... | B60N 2/067 248/424 |
| 2007/0157752 | A1 * | 7/2007 | Knopfle | ................. | B60N 2/067 74/27 |
| 2007/0214902 | A1 * | 9/2007 | Wang | ................... | F16H 25/2472 74/89.26 |
| 2008/0078908 | A1 * | 4/2008 | Koga | .................... | B60N 2/0232 248/298.1 |
| 2008/0105810 | A1 * | 5/2008 | Hofschulte | ............ | B60N 2/067 248/429 |
| 2008/0197654 | A1 * | 8/2008 | Livesey | ................ | B60N 2/067 296/65.13 |
| 2009/0120219 | A1 * | 5/2009 | Lykkegaard | ........ | F16H 25/2472 74/89.26 |
| 2010/0133408 | A1 * | 6/2010 | Umezaki | ................ | B60N 2/067 248/429 |
| 2011/0308340 | A1 | 12/2011 | Bosecker et al. | | |

FOREIGN PATENT DOCUMENTS

| | | |
|---|---|---|
| CN | 101797898 A | 8/2010 |
| CN | 102155519 A | 8/2011 |
| CN | 102317108 A | 1/2012 |
| DE | 10 2004 054 192 B3 | 2/2006 |
| DE | 20 2006 009 868 U1 | 11/2007 |
| DE | 20 2009 001 847 U1 | 8/2010 |
| DE | 10 2010 001 844 A1 | 8/2011 |
| DE | 10 2011 085 873 A1 | 5/2013 |
| EP | 0 311 478 A1 | 4/1989 |
| EP | 1 103 411 B1 | 11/2004 |
| EP | 1 534 555 B1 | 10/2007 |
| FR | 2 832 362 A1 | 5/2003 |
| KR | 20140090789 A | 7/2014 |

* cited by examiner

ADJUSTING DEVICE FOR A VEHICLE SEAT AND VEHICLE SEAT

CROSS REFERENCE TO RELATED APPLICATIONS

This application is a United States National Phase Application of International Application PCT/EP2016/055681, filed Mar. 16, 2016, and claims the benefit of priority under 35 U.S.C. § 119 of German Application 10 2015 205 249.4, filed Mar. 24, 2015, the entire contents of which are incorporated herein by reference.

FIELD OF THE INVENTION

The invention relates to an adjusting device for a vehicle seat, in particular to a longitudinal adjuster for a motor-vehicle seat, having at least one first adjusting element, having at least one second adjusting element, which can be moved relative to the first adjusting element, and having a spindle, which is assigned to the first adjusting element and has an external thread for interacting with an internal thread of a spindle nut assigned to the second adjusting element. The invention additionally relates to a vehicle seat having such an adjusting device.

BACKGROUND OF THE INVENTION

EP 1 103 411 B1 discloses an adjusting device which is intended for a vehicle seat and has a first adjusting element and a second adjusting element, which is connected for movement purposes to the first adjusting element, in particular a device for adjusting an underframe of the vehicle seat longitudinally in relation to a seat part, wherein the adjusting device has a spindle and an associated spindle nut, which engages around the spindle, and wherein the spindle is fixed in a rotationally secured manner on the first adjusting element of the adjusting device and the spindle nut is mounted in a rotatable manner in the second adjusting element and, on its outer lateral surface, has a worm wheel, which is produced from plastics material and is in engagement with a worm, which can be connected to a rotary drive. At each of its two axial end regions, the spindle nut has a metal reinforcing barrel engaging around it, said reinforcing barrel enclosing the respective end region of the spindle nut in annular form and being connected thereto in a rotationally secured manner.

SUMMARY OF THE INVENTION

The invention is based on the problem of improving an adjusting device, in particular a longitudinal adjuster for a vehicle seat of the type mentioned in the introduction. In particular, the intention is to avoid disruptive noise during adjustment of the adjusting device. In particular, the intention is to provide an adjusting device of high strength.

This problem is solved according to the invention by an adjusting device for a vehicle seat, having at least one first adjusting element, having at least one second adjusting element, which can be moved relative to the first adjusting element, and having a spindle, which is assigned to the first adjusting element and has an external thread for interacting with an internally threaded spindle nut assigned to the second adjusting element, wherein a main body of the spindle nut consists of metal, in particular steel, and the internal thread of the spindle nut consists, at least in part, of plastics material or is coated by a plastics-material layer.

Since a main body of the spindle nut consists of metal, in particular steel, and the internal thread of the spindle nut consists, at least in part, of plastics material or is coated by a plastics-material layer, it is possible to avoid noise which often arises, during adjustment of the adjusting device, as a result of insufficient lubrication between steel/steel pairings. The main body of the spindle nut made of metal increases the strength in comparison with a spindle nut which consists entirely of a plastics material.

As an alternative, or in addition, it is possible for a main body of the spindle to consist of metal, in particular steel, and for the external thread of the spindle to consist, at least in part, of plastics material or to be coated by a plastics-material layer. It is thus likewise possible to avoid noise which often arises, during adjustment of the adjusting device, as a result of insufficient lubrication between steel/steel pairings.

The adjusting device may be a longitudinal adjuster for a motor-vehicle seat. The adjusting device may be a height adjuster for a motor-vehicle seat. The adjusting device may be a seat-inclination adjuster for a motor-vehicle seat.

The internal thread of the spindle nut is preferably of multi-start design. The corresponding external thread of the spindle is then likewise of multi-start design. A multi-start internal thread of the spindle nut has the advantage that individual thread helices can be configured differently and can thus solve different partial problems.

The internal thread of the spindle nut is preferably of two-start design with a first thread helix and a second thread helix. The first thread helix is preferably formed in steel. The second thread helix preferably consists of a plastics material or is coated by a plastics-material layer.

The second thread helix can be introduced into a helically running groove in the main body of the spindle nut. The groove here is deep enough for a sufficient amount of installation space to be present for the purpose of introducing the second thread helix into the groove. The second thread helix can be produced by means of injection molding. The second thread helix can be introduced into the helically running groove in the main body of the spindle nut by injection molding and/or clamping and/or adhesive bonding and/or in some other suitable way.

A flank clearance between the external thread of the spindle and a second thread helix of the internal thread of the spindle nut is preferably smaller than a flank clearance between the external thread of the spindle and a first thread helix of the internal thread of the spindle nut. During normal operation of the adjusting device, the second thread helix is preferably in contact with the external thread and the first thread helix has an amount of clearance in relation to the external thread, wherein, under crash-induced loading, it is also the case that the first thread helix is in contact with the external thread. The second thread helix is preferably plastically deformable under crash-induced loading. As an alternative, it is possible for the second thread helix to be exclusively elastically deformable under crash-induced loading.

In a further preferred embodiment, the internal thread of the spindle nut consists entirely of a plastics material or is coated by a plastics-material layer. It is possible here for the internal thread of the spindle nut and the external thread of the spindle to be of single-start or multi-start design.

The external thread of the spindle consists preferably entirely of metal. The external thread of the spindle consists preferably entirely of steel. However, it is also possible for the spindle to be configured such that a main body of the spindle consists of metal, in particular steel, and the external thread of the spindle consists, at least in part, of plastics material or is coated by a plastics-material layer. It is possible here for all the above described features of the internal thread of the spindle nut to be transferred analogously to the external thread of the spindle.

In other words, and to summarize, the invention solves the aforementioned problem by introducing plastics material into the spindle nut, said plastics material functioning as a friction partner for a steel spindle. This avoids disruptive noise which often occurs, during adjustment, as a result of insufficient lubrication between steel/steel pairings.

It is preferably the case that a spindle nut for a spindle with a two-start trapezoidal thread has precisely two thread helices. Following positioning in a plastics injection mold, it is only the second thread helix which is produced in the plastics material. The flank clearance of the plastics-material thread helix is configured to be smaller than that of the steel thread helix. The aim is to achieve purely plastics-material/steel contact during adjustment. In the event of a crash, following plastic deformation of the plastics-material thread helix, the steel thread helix bears the maximum occurring loads.

A further preferred embodiment provides for the internal thread of a steel spindle nut for a spindle with a two-start trapezoidal thread to be internally coated entirely by a plastics-material layer. The metallic thread is produced with increased flank clearance, in order to create an amount of installation space for the plastics-material component. The overlap between the metallic thread parts is large enough here in order to be able to absorb crash-induced loading.

An external toothing formation of the spindle nut may be straight. An external toothing formation of the spindle nut may be helical. An external toothing formation of the spindle nut may be in engagement with a worm of the transmission. The spindle nut is then an externally toothed worm wheel of a worm transmission and, in addition, has the internal thread for the spindle drive. The worm can be driven by means of an in particular flexible shaft of an electric motor.

The problem is additionally solved by a vehicle seat having an adjusting device according to the invention. A vehicle seat having such an adjusting device is considerably less likely to generate disruptive noise during adjustment of the adjusting device.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
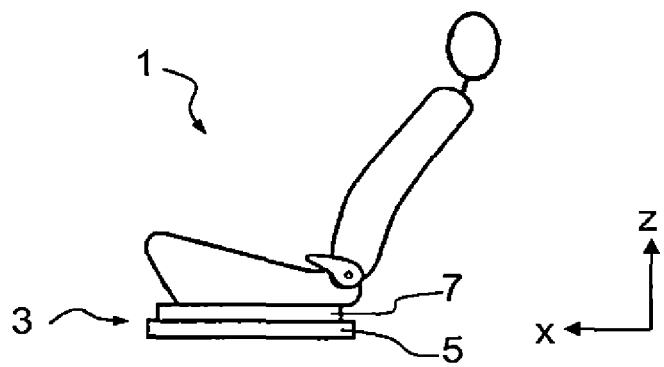
FIG. 1 is a schematic side view of a vehicle seat.

Referring to the drawings, a vehicle seat 1, which is illustrated schematically in FIG. 1, will be described hereinbelow using three directions in space which run perpendicularly in relation to one another. In the case of a vehicle seat 1 being installed in the vehicle, a longitudinal direction x runs largely horizontally and preferably parallel to a longitudinal direction of the vehicle, this latter direction corresponding to the customary direction of travel of the vehicle. A transverse direction y, which runs perpendicularly in relation to the longitudinal direction x, is likewise oriented horizontally in the vehicle and runs parallel to a transverse direction of the vehicle. A vertical direction z runs perpendicularly in relation to the longitudinal direction x and perpendicularly in relation to the transverse direction y. In the case of a vehicle seat 1 installed in the vehicle, the vertical direction z runs parallel to the vertical axis of the vehicle. The positional and directional information used, such as, for example, front/forward, rear/rearward, up/upward and down/downward, relates to a viewing direction of an occupant sitting in a normal sitting position in the vehicle seat 1. It is also possible, however, for the vehicle seat 1 according to the invention to be installed with a different orientation, for example transversely in relation to the direction of travel.

As a motor-driven adjusting device for changing the longitudinal position of the vehicle seat 1, the latter has a longitudinal adjuster 3 with a pair of seat rails on either side of the vehicle seat. The pair of seat rails comprises in each case a lower rail, which can be connected to the structure of the vehicle and constitutes a first seat rail 5, and an upper rail, which is fixed to the structure of the seat and constitutes a second seat rail 7. The first seat rail 5 and the second seat rail 7 engage around one another alternately in a manner which is known per se and are mounted on one another such that they can be displaced in the longitudinal direction x.

Figure 2:
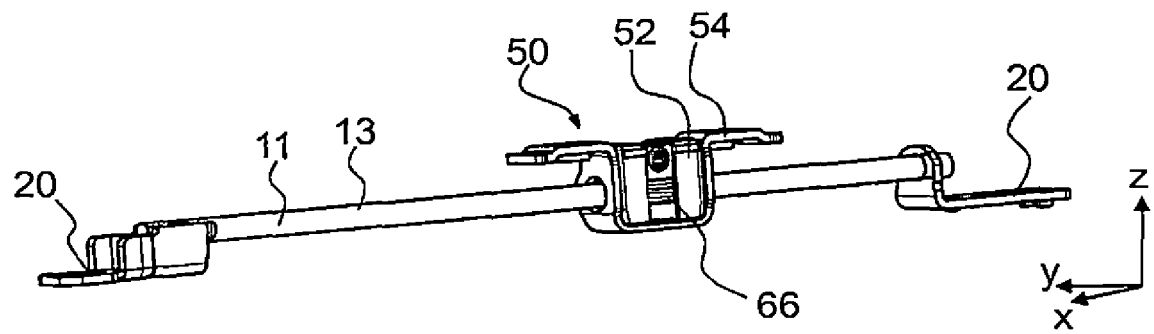
FIG. 2 is a perspective illustration of a spindle drive of a longitudinal adjuster.
Figure 3:
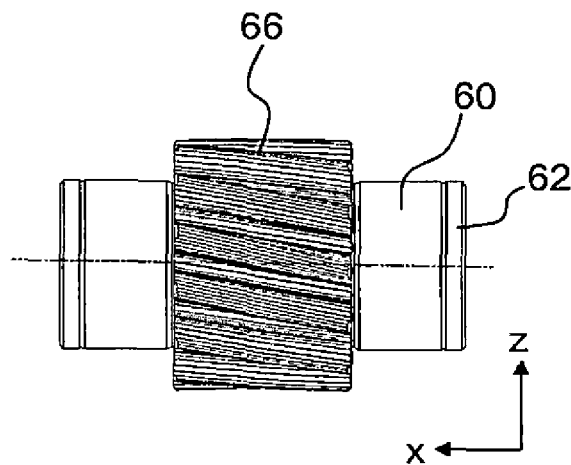
FIG. 3 is a side view of a spindle nut.
Figure 4:
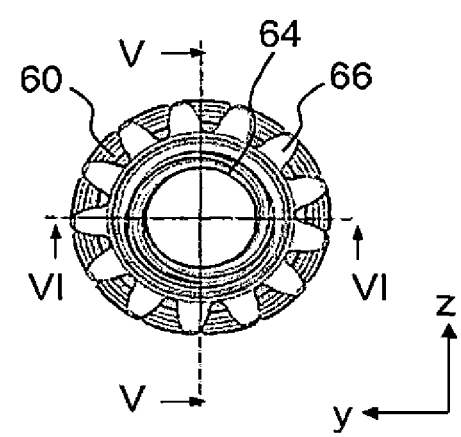
FIG. 4 is a front view as seen in the longitudinal direction of the spindle nut from FIG. 3.
Figure 5:
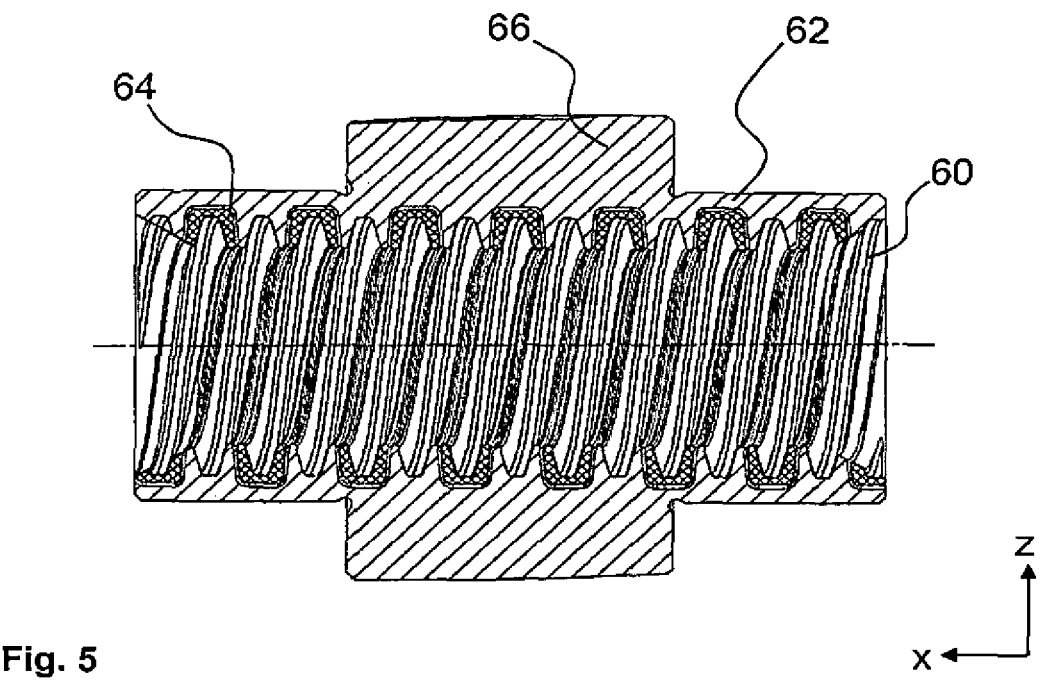
FIG. 5 is a section through the spindle nut more or less along line V-V in FIG. 4 and, incorporated therein, part of a spindle in toothed engagement with the spindle nut.
Figure 6:
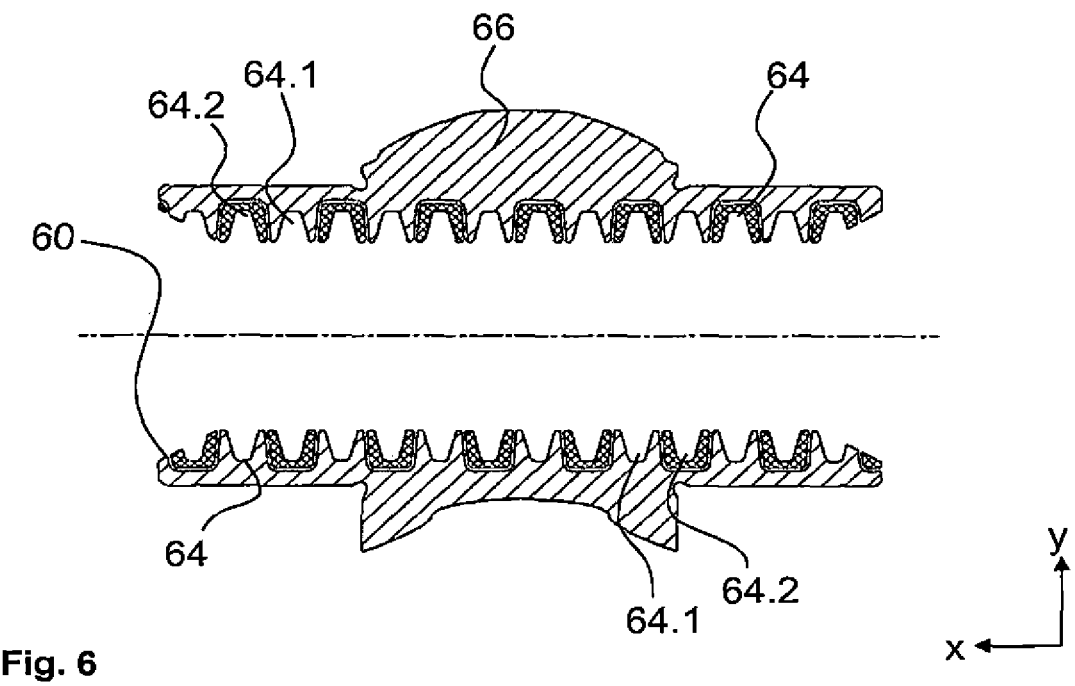
FIG. 6 is a sectional view through the spindle nut more or less along line VI-VI in FIG. 4.

FIG. 2 shows, schematically, a spindle drive of the longitudinal adjuster 3 according to the invention. The two seat rails 5, 7 form an installation space between them. This installation space of the pair of seat rails 5, 7 has arranged within it, in the longitudinal direction x, a spindle 11, which is connected to the first seat rail 5 and has an external thread 13 formed on its outside. The external thread 13, in this case, is a two-start trapezoidal thread. A front end and a rear end of the spindle 11 are each fastened on the first seat rail 5 by means of a spindle holder 20. The spindle 11 is arranged, by means of the spindle holder 20, in the installation space between the two seat rails 5, 7 and is fixed on the first seat rail 5 at a distance apart from walls of the first seat rail 5.

A transmission 50, which can be driven by a motor of the longitudinal adjuster 3 and is mounted in a housing 52, which is fixed to the second seat rail 7 by means of a retaining bracket 54, has—in addition to other transmission elements which are in transmission connection with one another—a spindle nut 60, which has an internal thread 64 and an external toothing formation 66. The internal thread 64, in the present case, is a two-start trapezoidal thread, which complements the external thread 13 of the spindle 11. The spindle nut 60 is screwed onto the spindle 11, and therefore the spindle 11 runs through the spindle nut 60 in the longitudinal direction x. The internal thread 64 of the spindle nut 60 here is in engagement with the external thread 13 of the spindle 11. Rotation of the spindle nut 60 and the spindle 11 relative to one another allows the spindle nut 60 to be moved in the longitudinal direction x relative to the spindle 11. If the motor drives the transmission 50, then the spindle nut 60 is rotated by means of the external toothing formation 66. The spindle nut 60 thus shifts along the spindle 11, and in doing so carries along the transmission 50 and therefore the second seat rail 7 and a superstructure of the vehicle seat 1, the superstructure being connected to the second seat rail.

FIGS. 3 to 6 show the spindle nut 60 of the longitudinal adjuster 3 according to the invention. The spindle nut 60 has a main body 62 made of steel. The internal thread 64 is a two-start thread and therefore has a first thread helix 64.1 and a second thread helix 64.2, which runs parallel to the first thread helix 64.1.

The first thread helix 64.1 is produced in steel. The first thread helix 64.1 is incorporated directly in the main body 62. The second thread helix 64.2 is made of plastics material. The second thread helix 64.2 is introduced into an encircling groove in the main body 62, for example by means of injection molding. A flank clearance of the second thread helix 64.2, which consists of plastics material, is smaller than the flank clearance of the first thread helix 64.1. During normal operation of the longitudinal adjuster 3, it is only the second thread helix 64.2 which performs a bearing function. A second thread helix of the external thread 13 of the spindle 11 is thus in contact with the plastics material of the second thread helix 64.2. A first thread helix of the external thread 13 of the spindle 11, however, is not in contact with the steel of the first thread helix 64.1. During normal operation, it is therefore purely plastics-material/steel contact which prevails. In the event of a crash, following plastic deformation of the plastics material of the second thread helix 64.2, the first thread helix 64.1 made of steel bears the maximum occurring loads.

In a second exemplary embodiment, which is not illustrated in the figures, a main body of the spindle nut likewise consists of steel. The internal thread of the spindle nut is internally coated entirely by a plastics-material layer. The main body made of steel has increased flank clearance, in order to create an amount of installation space for the plastics-material component. The overlap between the metallic thread components is large enough here in order to be able to absorb crash-induced loading.

The features disclosed in the above description, the claims and the drawings may be important both individually and in combination for realizing the various configurations of the invention.

Although the invention has been described in detail in the drawings and the account given above, the accounts should be understood as being illustrative and by way of example and non-restrictive. In particular, the selection of the proportions illustrated for the individual elements in the drawings should not be interpreted as being necessary or limiting. Furthermore, the invention is, in particular, not limited to the exemplary embodiments explained. Further variants of the invention and the implementation thereof can be gathered by a person skilled in the art from the above disclosure, the figures and the patent claims.

Terms such as "comprise", "have" and "contain" and the like used in the patent claims do not rule out other elements or steps. The use of the indefinite article does not rule out a plurality. An individual device can perform the functions of a plurality of devices or units mentioned in the patent claims.

While specific embodiments of the invention have been shown and described in detail to illustrate the application of the principles of the invention, it will be understood that the invention may be embodied otherwise without departing from such principles.

The invention claimed is:

1. An adjusting device for a vehicle seat, the adjusting device comprising:
   at least one first adjusting element;
   at least one second adjusting element which can be moved relative to the first adjusting element;
   a spindle nut which is assigned to the second adjusting element; and
   a spindle which is assigned to the first adjusting element and has an external thread for interacting with an internal thread of the spindle nut, wherein a main body of the spindle nut comprises metal and the internal thread of the spindle nut comprises a plastics material or is coated by a plastics-material layer and the internal thread of the spindle nut is of two-start configuration comprising a first thread helix and a second thread helix, wherein the first thread helix is formed of steel, and the second thread helix is formed of plastics material or is coated by the plastics-material layer and first thread helix and the second thread helix are intertwined with each other on the spindle nut.

2. The adjusting device as claimed in claim 1, wherein the adjusting device is a longitudinal adjuster having at least one first seat rail as the first adjusting element and at least one second seat rail as the second adjusting element.

3. The adjusting device as claimed in claim 1, wherein the internal thread of the spindle nut is of multi-start configuration.

4. The adjusting device as claimed in claim 1, wherein the plastics material forming the second thread helix is introduced into a helically running groove in the main body of the spindle nut to form the second thread helix.

5. The adjusting device as claimed in claim 4, wherein the second thread helix is produced by injection molding with plastic material of the second thread helix introduced into the helically running groove in the main body of the spindle nut by injection molding.

6. The adjusting device as claimed in claim 1, wherein a flank clearance between the external thread and the second thread helix is smaller than a flank clearance between the external thread and the first thread helix.

7. The adjusting device as claimed in claim 1, wherein:
   during normal operation of the adjusting device, the second thread helix is in contact with the external thread and the first thread helix has an amount of clearance in relation to the external thread; and
   under crash-induced loading, the first thread helix is in contact with the external thread.

8. The adjusting device as claimed in claim 7, wherein the second thread helix is plastically deformable under crash-induced loading.

9. The adjusting device as claimed in claim 1, wherein the external thread of the spindle consists of steel.

10. The adjusting device as claimed in claim 1, wherein a main body of the spindle consists of metal and the external thread of the spindle comprises plastics material or is coated by plastics-material layer.

11. An adjusting device for a vehicle seat, the adjusting device comprising:
    at least one first adjusting element;
    at least one second adjusting element, which can be moved relative to the first adjusting element;
    a spindle nut assigned to the second adjusting element;

a spindle, which is assigned to the first adjusting element and has an external thread for interacting with an internal thread of the spindle nut, wherein:

a main body of the spindle consists of metal and the external thread of the spindle consists, at least in part, of plastics material or is coated by a plastics-material layer;

the internal thread of the spindle nut is of a multi-start configuration comprising a first thread helix and a second thread helix; and the first thread helix and the second thread helix are intertwined on the spindle nut.

12. A vehicle seat comprising an adjusting device comprising:

at least one first adjusting element;

at least one second adjusting element which can be moved relative to the first adjusting element;

a spindle nut which is assigned to the second adjusting element, the spindle nut having an internal thread having a two-start configuration comprising a first thread helix and a second thread helix intertwined with the first thread helix; and a spindle assigned to the first adjusting element and having an external thread for interacting with the internal thread of the spindle nut, wherein:

a main body of the spindle nut comprises metal and the internal thread of the spindle nut comprises a plastics material or is coated by a plastics-material layer and the first thread helix is formed of steel and the second thread helix is formed of plastics material or is coated by the plastics-material layer; or a main body of the spindle comprises metal and the external thread of the spindle comprises plastics material or is coated by a plastics-material layer; or a main body of the spindle nut comprises metal and the internal thread of the spindle nut comprises a plastics material or is coated by a plastics-material layer and the first thread helix is formed of steel and the second thread helix is formed of plastics material or is coated by the plastics-material layer and a main body of the spindle comprises metal and the external thread of the spindle comprises plastics material or is coated by a plastics-material layer.

13. The vehicle seat as claimed in claim 12, wherein the adjusting device is a longitudinal adjuster having at least one first seat rail as the first adjusting element and at least one second seat rail as the second adjusting element.

14. The vehicle seat as claimed in claim 12, wherein the plastics material forming the second thread helix is introduced into a helically running groove in the main body of the spindle nut to form the second thread helix.

15. The vehicle seat as claimed in claim 14, wherein the second thread helix is produced by injection molding with plastic material of the second thread helix introduced into the helically running groove in the main body of the spindle nut by injection molding.

16. The vehicle seat as claimed in claim 12, wherein a flank clearance between the external thread and the second thread helix is smaller than a flank clearance between the external thread and the first thread helix.

17. The vehicle seat as claimed in claim 12, wherein:

during normal operation of the adjusting device, the second thread helix is in contact with the external thread and the first thread helix has an amount of clearance in relation to the external thread; and under crash-induced loading, the first thread helix is in contact with the external thread.

18. The vehicle seat as claimed in claim 17, wherein the second thread helix is plastically deformable under crash-induced loading.

19. The vehicle seat as claimed in claim 12, wherein the external thread of the spindle consists of steel.

20. The vehicle seat as claimed in claim 12, wherein the internal thread of the spindle nut consists entirely of plastics material or is coated by the plastics-material layer.

\* \* \* \* \*